(12) United States Patent
Valecha et al.

(10) Patent No.: US 11,101,997 B2
(45) Date of Patent: Aug. 24, 2021

(54) CRYPTOGRAPHIC KEY MANAGEMENT

(71) Applicant: International Business Machines Corporation, Armonk, NY (US)

(72) Inventors: Vinod A. Valecha, Pune (IN); Rinkesh I. Bansal, Pune (IN); Sanjay B. Panchal, Mumbai (IN); Chintan Thaker, Pune (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/458,733

(22) Filed: Jul. 1, 2019

(65) Prior Publication Data

US 2021/0006401 A1    Jan. 7, 2021

(51) Int. Cl.
*H04L 9/08*        (2006.01)

(52) U.S. Cl.
CPC ........... *H04L 9/0894* (2013.01); *H04L 9/088* (2013.01); *H04L 9/0872* (2013.01)

(58) Field of Classification Search
CPC ...... H04L 9/0894; H04L 9/088; H04L 9/0872
See application file for complete search history.

(56) References Cited

U.S. PATENT DOCUMENTS

| | | | |
|---|---|---|---|
| 8,266,286 B2 | 9/2012 | Kamarthy | |
| 9,178,698 B1 * | 11/2015 | Jarjur | H04L 9/0861 |
| 9,438,421 B1 * | 9/2016 | Roth | H04L 9/088 |
| 9,819,495 B2 | 11/2017 | Suryavanshi | |
| 10,372,926 B1 * | 8/2019 | Leshinsky | H04L 9/0894 |
| 2003/0138105 A1 | 7/2003 | Challener | |
| 2016/0099813 A1 * | 4/2016 | Suryavanshi | H04L 9/14 713/175 |
| 2017/0262638 A1 | 9/2017 | Horowitz | |
| 2018/0041336 A1 * | 2/2018 | Keshava | G06F 21/33 |
| 2018/0046516 A1 * | 2/2018 | Sharkey | G06F 12/1433 |
| 2018/0287785 A1 | 10/2018 | Pfannenschmidt | |
| 2020/0053079 A1 * | 2/2020 | Bendersky | H04L 9/0825 |

FOREIGN PATENT DOCUMENTS

WO    2012003689 A1    1/2012

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

*Primary Examiner* — Matthew Smithers
(74) *Attorney, Agent, or Firm* — David K. Mattheis; Maeve M. Carpenter

(57) ABSTRACT

Cryptographic key provisioning by determining future cryptographic key demand according to historic key demand and key access requirements, determining cryptographic key provisioning resources for the future cryptographic key demand, and providing cryptographic keys, prior to the determined future cryptographic key demand using the cryptographic key provisioning resources.

17 Claims, 4 Drawing Sheets

CRYPTOGRAPHIC KEY MANAGEMENT

BACKGROUND

The disclosure relates generally to managing cryptographic key generation and access. The disclosure relates particularly to life-cycle management of cryptographic keys for devices and applications.

Cryptographic key management systems (CKMS), also known as Key management systems (KMS) provide an integrated solution for generating, distributing and otherwise managing cryptographic keys for use by system devices and applications. A KMS may include backend functionality for key generation, distribution, and replacement, as well as frontend, or client, functionality for injecting keys for use, as well as storing and managing keys on networked system devices.

SUMMARY

Aspects of the invention disclose methods, systems and computer readable media associated with cryptographic key provisioning by determining future cryptographic key demand according to historic key demand and key access requirements, determining cryptographic key provisioning resources for the future cryptographic key demand, and providing cryptographic keys prior to the future cryptographic demand using the cryptographic key provisioning resources.

DETAILED DESCRIPTION

Figure 1:
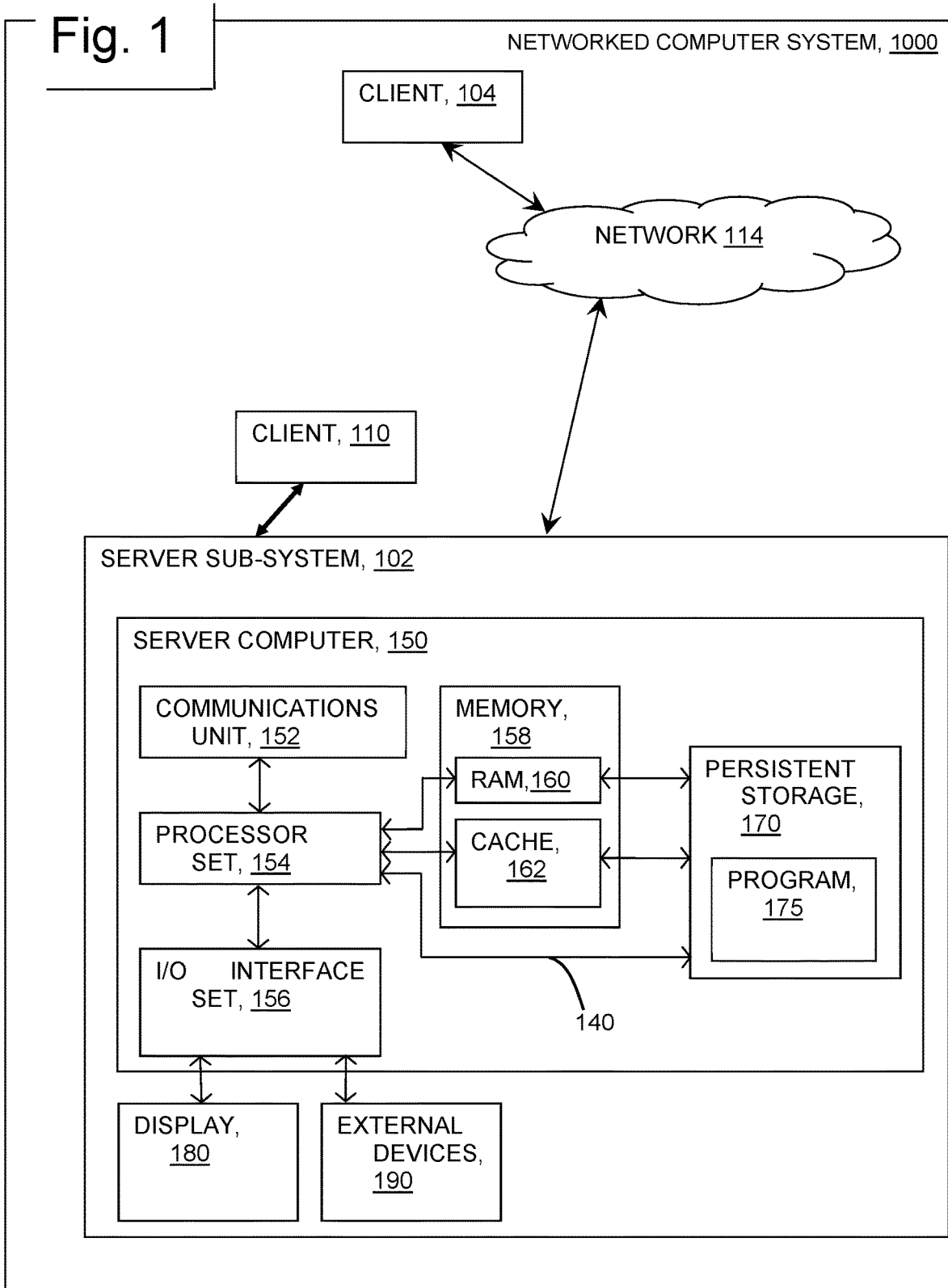
FIG. 1 provides a schematic illustration of a system, according to an embodiment of the invention.

Though KMS can provide an integrated approach for the generation, distribution and storage of cryptographic keys, such systems can be inefficient in their use of system resources. Large numbers of keys may be created in anticipation of key demand which does not materialize, wasting system resources in the creation and storage of the unneeded keys. The KMS may wait until there is an actual demand for a new key before creating the key, wasting time while the key is created. Similarly, the KMS may wait until a key is requested to load the key for use, again wasting time in the process. What is desired is an efficient method for generating and managing cryptographic keys.

In an embodiment, a KMS connects to system components in order to accurately identify future key needs. In this embodiment, the KMS connects to procurement systems, work ticketing systems, maintenance planning systems and other scheduling systems. The KMS identifies future key demand by analyzing procurement, ticketing, maintenance planning, and other system scheduling activities.

In an embodiment, the KMS analyzes historic key demand and key access requirements as a predictor of future key demand. In an embodiment, the KMS determines that there are seasonal demand peaks which occur and for which preparations can be made in terms of generating and caching keys.

In an embodiment, the KMS determines the time and resources (containers, etc.) necessary for the creation of the identified future key demand. The KMS requests or allocates system resources needed for key creation and schedules the key generation to occur before the actual future demand. In this embodiment, the KMS generates symmetric keys using one of the data encryption standard (DES), advanced encryption standard (AES), or an asymmetric public-private key pair using the Rivest-Shamir-Adleman (RSA) encryption methods.

As an example, the KMS identifies the planned purchase of 1000 new tapes by reviewing approved requisition entries in a procurement system using natural language processing or other machine learning methods, where each tape requires a key. The tapes have a scheduled delivery date. In an embodiment, the KMS plans for the creation of the 1000 keys in advance of the scheduled delivery date. The KMS determines the resources and time necessary for the generation and storage of the 1000 keys. Beginning with the scheduled delivery time for the 1000 tapes, the KMS determines when to begin generation of the new keys such that all the keys are generated and served when the tapes are received. The number of keys generated and served is exactly the number identified as actually needed instead of an estimate of the demand. Resources are used to provide keys just-in-time to meet the future demand for the keys.

In an embodiment, the KMS analyzes scheduled maintenance activities which require key generation and service. As an example, KMS identifies a maintenance scheduling request for a data center which will include the rebooting of multiple storage and other system devices. In this embodiment, the KMS will provision and serve new keys for the rebooted devices. The KMS identifies the number of keys needed together with the time and resources needed to provision and serve the keys to the device. Beginning with the known time of the scheduled maintenance work (the known time of the actual key demand) and working backwards according to the amount of time needed to provision and serve the keys, the KMS provisions and serves the keys to the devices just-in-time to avoid disrupting the operations of the data center.

In an embodiment, the KMS uses the prediction of future demand to identify and address, non-compliant, potentially malicious, system activities. In this embodiment, the KMS treats any current, but not predicted, key demand as non-compliant. Non-compliant requests for keys are refused and no keys are generated or provided. In this embodiment, in addition to refusing to issue new keys, the KMS revokes the requesting credentials of repeatedly non-compliant devices. In this embodiment, a user or device overcomes the non-compliant status by providing additional credentials to the KMS and receiving a new key. Non-compliant systems can be identified as systems failing to present the proper sized key, having an expired key certificate, having a weak encryption cypher—as determined by comparison to previously identified weak encryption cyphers. The method may further analyze historical data relating to non-compliance and identify a non-compliant system as one fitting a pattern of encryption elements associated with a previous encryption non-compliance.

In an embodiment, the KMS tracks the locations and usage of mobile keys such as those stored on mobile devices and mobile internet of things (IoT) sensors. In this embodiment, the KMS develops a profile of behavior for each of the tracked devices. In this embodiment, the profile includes additional information regarding the user of the device gleaned from other components of the system including access point card readers, device geo location data, system resource usage by logged-in users, social engineering, etc. The profile enables the KMS to efficiently allocate resources for the key credentials of the devices, and to identify non-complaint activities. In this embodiment, the KMS provisions and serves keys according to a key life-cycle defined by the profile of the device and associated user.

As an example, the KMS profile of user A, based upon data unique to A, indicates that A always logs in to their workstation within a defined time window after entering their building at a secure access point. The KMS allocates A's new key after the building is entered and serves the key before the beginning of the window. The life-cycle of the key relates to the defined time window. The key is inoperable before and after the limits of the time window. Attempts by A to access the system either before or after the defined time window are considered non-complaint and additional user credentials are required to allow access. The profile for user B would be based upon data unique to B and could indicate different system usage patterns.

In an embodiment, the efficiency of the KMS is increased by the use of a ranking function. The ranking function is used to calculate a rank for each entity interacting with the KMS, using a defined set of parameters. In an embodiment, the ranking function is:

$$R(E) = \left[\sum_{i=1}^{n} v(p_i) * W(p_i)\right] / n$$

With:
E, the entity to be ranked;
$p_i$, $i^{th}$ parameter of a set of n parameters, to calculate rank;
V, the value of the parameter;
W, the weighting of the parameter among the set of parameters; and
n, the number of parameters in the set.

In an embodiment, the parameters include:
total usage, the total time the entity uses system resources;
usage frequency, the number of times the entity has requested keys from the KMS;
average usage, the average time the entity uses each key; and
compliance, the number of times the entity has be identified as non-compliant.

The weighting, W, of the ranking function can be used to define the priorities of the KMS. In an embodiment, a high security KMS defines W for a compliance parameter as greater than 50% of the overall weighting. In an embodiment, a KMS favoring high frequency users has a W for a usage frequency parameter of greater than 50%. Similarly, favoring entities according to a total usage parameter or an average usage parameter results in high weighting percentages for those parameters.

In an embodiment, the ranking of entities is used in conjunction with a threshold limit function. The threshold limit function is used to prioritize entities for generation and key service by the KMS. Key needs for entities above a set threshold are prioritized above those of entities below the threshold in cases of conflicting demands for KMS resources. In an embodiment, the threshold limit function comprises:

$$TL = \left[\sum_{i=1}^{n} R(Ei)\right] / n$$

Where,
R(Ei), is the rank of entity Ei; and
n, is the number of entities.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise cryptographic key management application program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the cryptographic key management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., cryptographic key management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
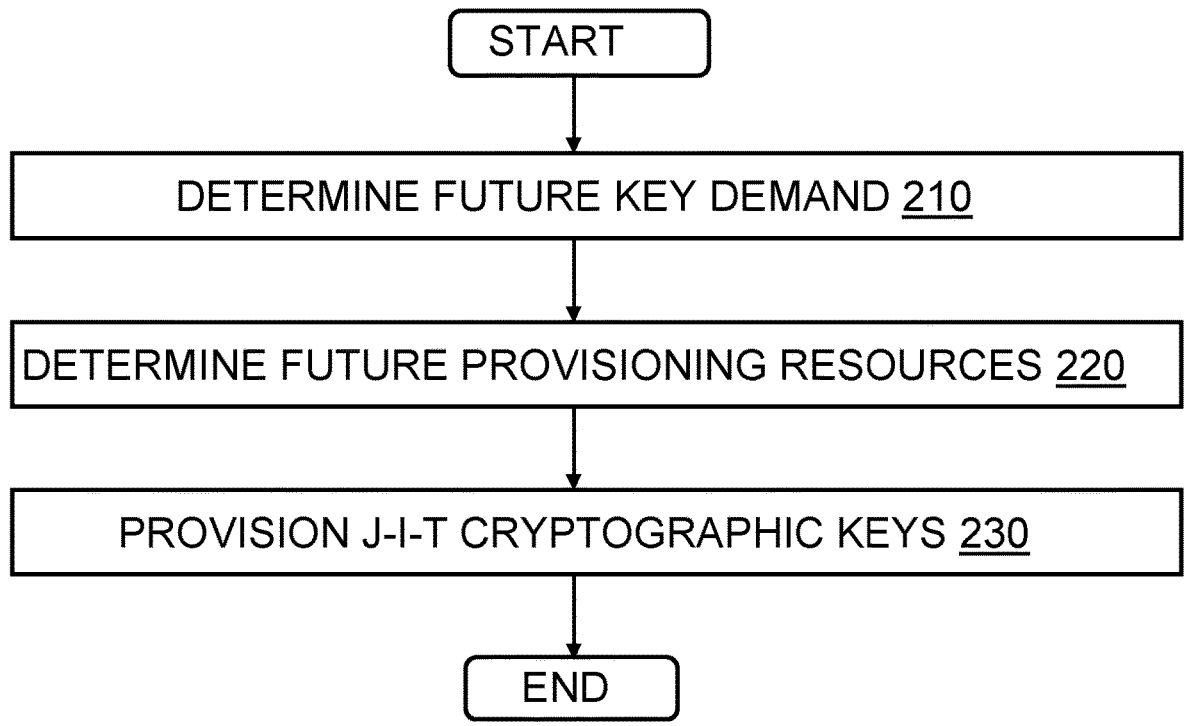
FIG. 2 provides a flowchart depicting an operational sequence, according to an embodiment of the invention.

FIG. 2 provides a flowchart 200, illustrating exemplary activities associated with the practice of the disclosure. After program start, the processor(s) 154, of the server sub-system 102, determines future key demand at 210. Processor(s) 154 is connected via network 114 to other components of the system, such as procurement and scheduling systems. The cryptographic key management program evaluates information from the other system components to determine future cryptographic key demand. At 220, the processor set determines the resources and time associated with the generation and serving of the determined future key demand. At 230, the cryptographic key management software and processor set generate and serve the cryptographic keys of the determined future demand according to the timing of the future demand less the time needed to generate and serve the keys. The keys are generated and served/synched to client devices 104 and 110, prior to the predicted system key demand. The keys are cached/stored in persistent storage 170, of the server sub-system until the actual demand for the key occurs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
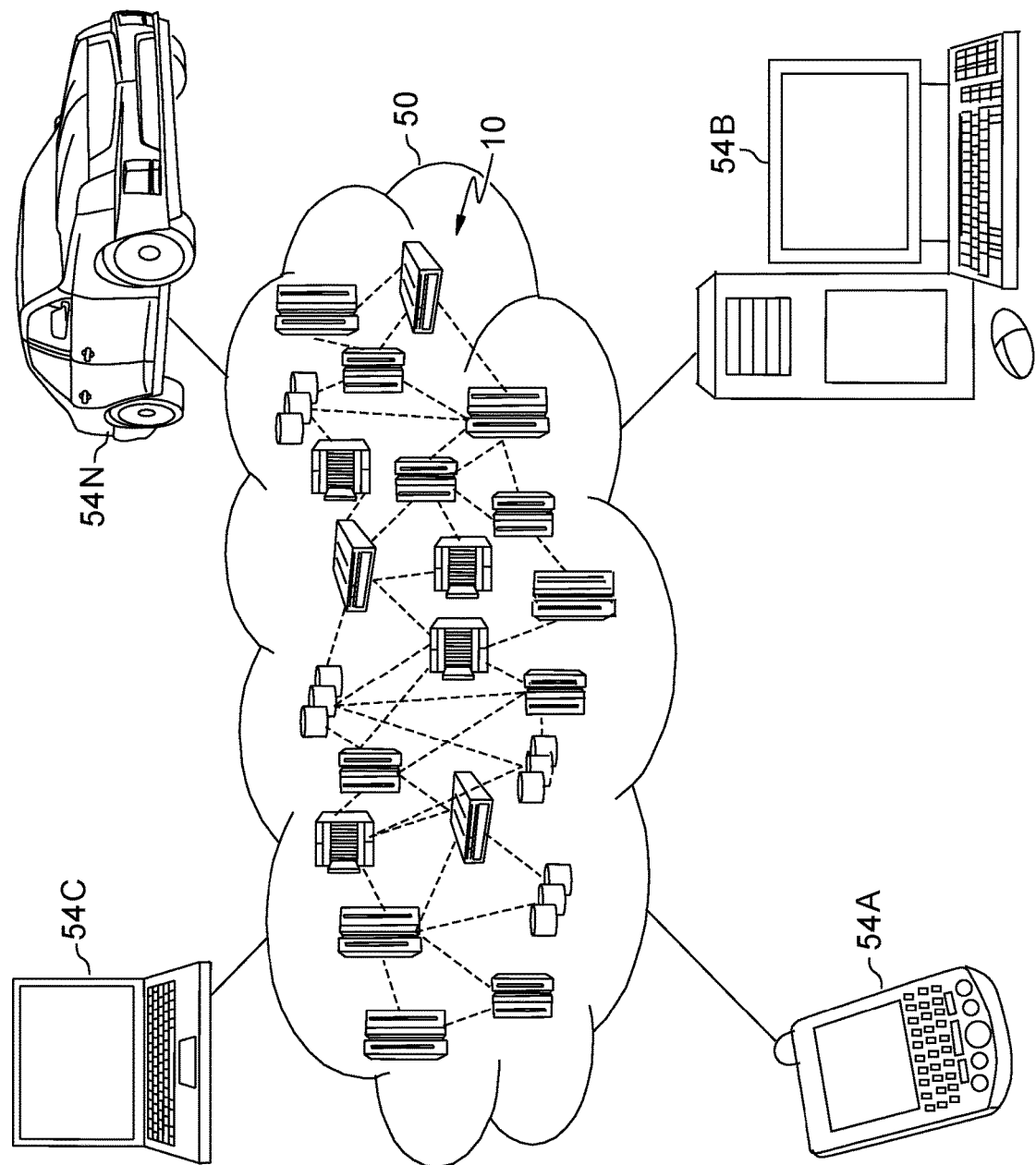
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
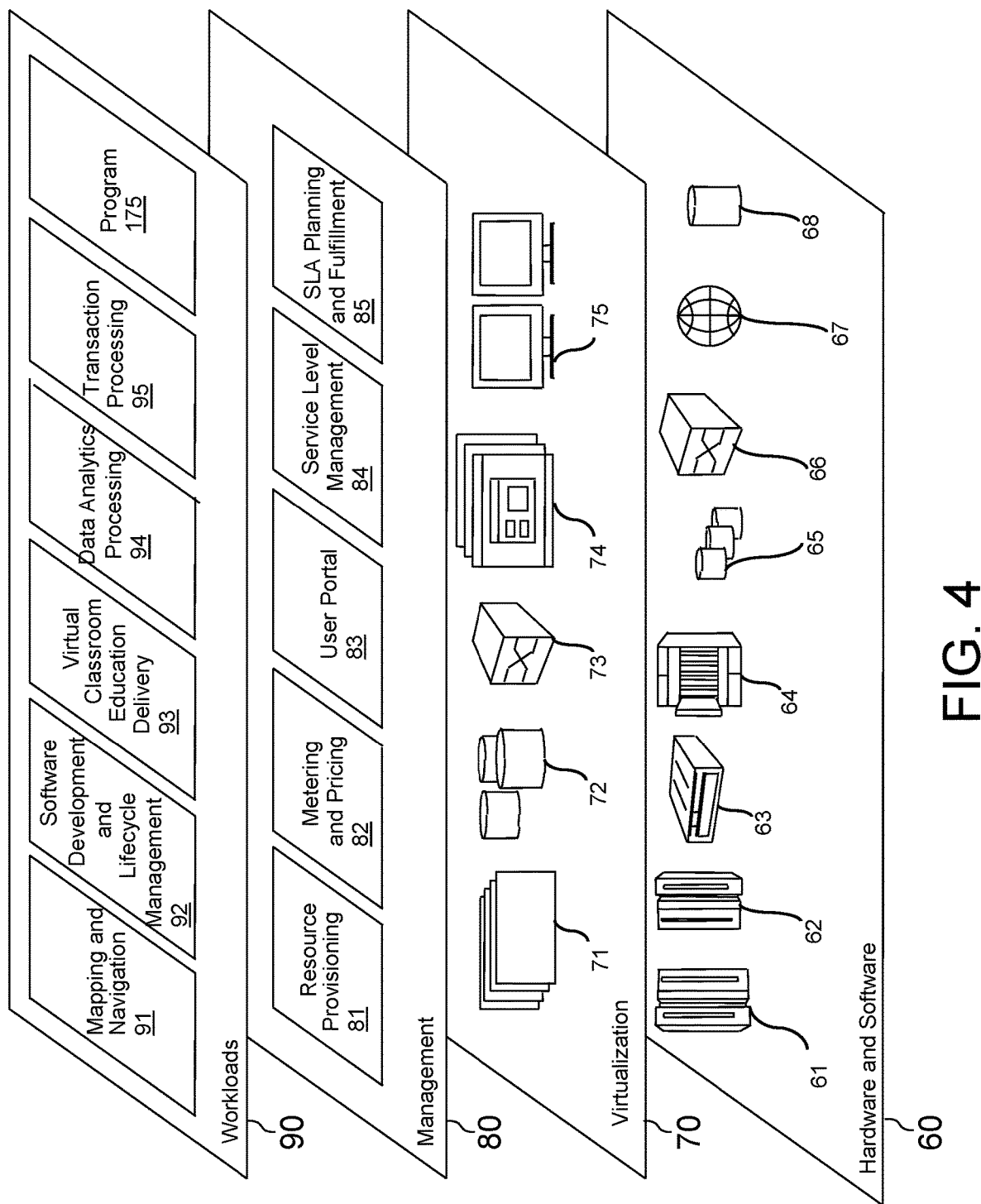
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptographic key management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the Figures. The terms "overlying", "atop", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for cryptographic key provisioning, the method comprising:
    determining future cryptographic key demand according to historic key demand and key access requirements;
    determining cryptographic key provisioning resources for the future cryptographic key demand;
    provisioning cryptographic keys having a defined life-cycle, according to a user location; and
    providing cryptographic keys prior to the future cryptographic key demand using the cryptographic key provisioning resources.

2. The computer implemented method according to claim 1, further comprising:
    identifying non-compliant system activity associated with cryptographic key demand, wherein the non-compliant system activity is not associated with the future cryptographic key demand; and
    refusing to provide a cryptographic key in response to the non-compliant system activity.

3. The computer implemented method according to claim 1, further comprising:
    provisioning cryptographic keys according to a ranking function.

4. The computer implemented method according to claim 3, wherein the ranking function is selected from the group consisting of: active time of a requesting entity, number of requests by the entity, average key usage time, and compliance level of the entity.

5. The computer implemented method according to claim 1, further comprising provisioning cryptographic keys according to a threshold limit.

6. The computer implemented method according to claim 5, wherein the threshold limit is based at least in part on a factor selected from the group consisting of: an entity ranking, and a total number of entities.

7. A computer program product for cryptographic key provisioning, the computer program product comprising one or more computer readable storage devices and stored program instructions on the one or more computer readable storage devices, the stored program instructions comprising:
    program instructions for determining future cryptographic key demand according to historic key demand and key access requirements;
    program instructions for determining cryptographic key provisioning resources for the future cryptographic key demand;
    program instructions for provisioning cryptographic keys having a defined life-cycle, according to a user location and
    program instructions for providing cryptographic keys prior to the future cryptographic key demand using the cryptographic key provisioning resources.

8. The computer program product according to claim 7, the stored program instructions further comprising:
    program instructions for identifying a non-compliant system activity associated with cryptographic key demand, wherein the non-compliant system activity is not associated with the future cryptographic key demand; and
    program instructions for refusing to provide a cryptographic key in response to the non-compliant system activity.

9. The computer program product according to claim 7, the stored program instructions further comprising program instructions for provisioning cryptographic according to a ranking function.

10. The computer program product according to claim 9, wherein the ranking function is selected from the group consisting of: active time of a requesting entity, number of requests by the entity, average key usage time, and compliance level of the entity.

11. The computer program product according to claim 7, the stored program instructions further comprising program instructions for provisioning cryptographic keys according to a threshold limit.

12. The computer program product according to claim 11, wherein the threshold limit is based at least in part upon a factor selected from the group consisting of: an entity ranking, and a total number of entities.

13. A computer system for cryptographic key provisioning, the computer system comprising:
    one or more computer processors;
    one or more computer readable storage devices; and
    program instructions stored on the one or more computer readable storage devices for execution by the one or more computer processors, the stored program instructions comprising:
        program instructions for determining future cryptographic key demand according to historic key demand and key access requirements;
        program instructions for determining cryptographic key provisioning resources for the future cryptographic key demand;
        program instructions for provisioning cryptographic keys having a defined life-cycle, according to a user location; and
        program instructions for providing cryptographic keys prior to the future cryptographic key demand using the cryptographic key provisioning resources.

14. The computer system according to claim 13, the stored program instructions further comprising:
    program instructions for identifying a non-compliant system activity associated with cryptographic key demand, wherein the non-compliant system activity is not associated with the future cryptographic key demand; and
    program instructions for refusing to provide a cryptographic key in response to the non-complaint system activity.

15. The computer system according to claim 13, the stored program instructions further comprising program instructions for provisioning cryptographic according to a ranking function.

16. The computer system according to claim 15, wherein the ranking function is selected from the group consisting of: active time of a requesting entity, number of requests by the entity, average key usage time, and compliance level of the entity.

17. The computer system according to claim 13, the stored program instructions further comprising program instructions for provisioning cryptographic keys according to a threshold limit.

* * * * *